United States Patent [19]

Palau

[11] Patent Number: 5,312,305
[45] Date of Patent: May 17, 1994

[54] SPEED REDUCER OF THE CYCLOIDAL TYPE FOR ROBOTS AND OTHER INDUSTRIAL MANIPULATORS

[75] Inventor: Joseph Palau, Duingt, France
[73] Assignee: S.A. des Etablissements Staubli, Favegges, France
[21] Appl. No.: 977,020
[22] Filed: Nov. 16, 1992
[30] Foreign Application Priority Data
Nov. 21, 1991 [FR] France .................. 91 14609
[51] Int. Cl.⁵ ............................................. F16H 1/32
[52] U.S. Cl. ................................................. 475/162
[58] Field of Search .................................. 475/162

[56] References Cited

U.S. PATENT DOCUMENTS

| | | | |
|---|---|---|---|
| 1,836,587 | 12/1931 | Godfrey | 475/162 X |
| 1,836,602 | 12/1931 | King | 475/162 X |
| 1,942,794 | 1/1934 | Benson | 475/162 OR |
| 4,843,911 | 7/1989 | Minegishi et al. | 475/162 X |
| 5,080,638 | 1/1992 | Osborn | 475/162 X |

FOREIGN PATENT DOCUMENTS

| | | | |
|---|---|---|---|
| 1359792 | 3/1964 | France | |
| 0480963 | 3/1938 | United Kingdom | 475/162 |

Primary Examiner—Leslie A. Braun
Assistant Examiner—Daniel Wittels
Attorney, Agent, or Firm—Dowell & Dowell

[57] ABSTRACT

A speed reducer of the cycloidal type for robots and other industrial manipulators which includes actuation fingers introduced in openings of toothed cams controlled by rotating eccentrics. Each actuation finger is formed by a roller bearing having an inner ring mounted about a pin with clearance to thereby allow self-centering of an outer ring of each roller bearing in its respective opening.

3 Claims, 3 Drawing Sheets

SPEED REDUCER OF THE CYCLOIDAL TYPE FOR ROBOTS AND OTHER INDUSTRIAL MANIPULATORS

BACKGROUND OF THE INVENTION

1. Field of the Invention

The present invention relates to speed reducers adapted to ensure angular actuation of the movable members of robots, industrial manipulators, rotary machining plates and other like applications.

2. History of the Related Art

It is known that, in this type of apparatus, there is provided for each movable member a kinematic chain comprising an input shaft driven by an autonomous motor and connected, via a speed reducer, to an output shaft secured to the movable member. As the speed of rotation of the input shaft is much higher than that desired for the output shaft, reducers of the cycloidal type are ordinarily employed.

It will be recalled that a conventional cycloidal reducer comprises in principle at least one eccentric (in fact, two opposite eccentrics are most often employed in order to obtain a better balancing of forces), which is connected to the input shaft with to ensure, by rotation, the control of a circular cam whose periphery is toothed in order to cooperate with fixed teeth. The number of fixed teeth is slightly greater (in practice by one unit) than that of the periphery of the cam. In addition, there is associated with the cam at least one actuation finger which is carried by a plate angularly connected to the output shaft and which is engaged inside a housing made in the cam (or, in the ordinary case of two parallel cams, in a housing defined by two conjugate openings of the two cams).

It will be understood that the primary motion applied by the input shaft to the eccentric causes the corresponding toothed cam to roll on the fixed outer teeth and thus to ensure, via the actuation fingers, drive of the output shaft in a ratio which depends on the number of teeth of the cam and on the difference of this number with respect to that of the fixed toothing, the cam backing by this difference for a revolution of the eccentric.

It will be readily appreciated that, for the correct functioning of such a cycloidal reduction system to be satisfactory, it is indispensable that all the parts of the mechanism be subjected to very precise machining completed by a careful finish or a pairing of the elements at assembly, which obviously increases, very substantially, the cost price of the speed reducer assembly.

SUMMARY OF THE INVENTION

It is an object of the present invention to overcome these drawbacks by forming each actuation finger with a cylindrical member which has clearance relative to its support to allow, during assembly, the selfcentering of the member in the opening or housing of the corresponding toothed cam.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
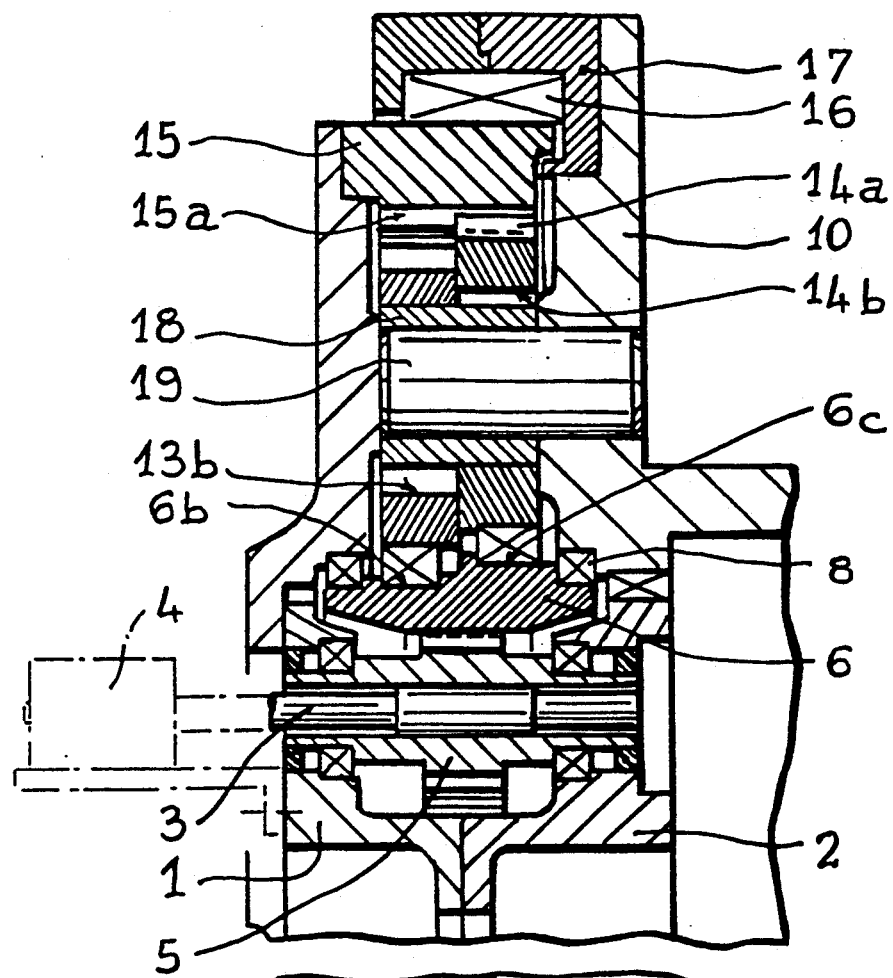
FIG. 1 is an axial section showing the general arrangement of a cycloidal reducer of the type used up to the present time in the robot or manipulator industry.
Figure 1:
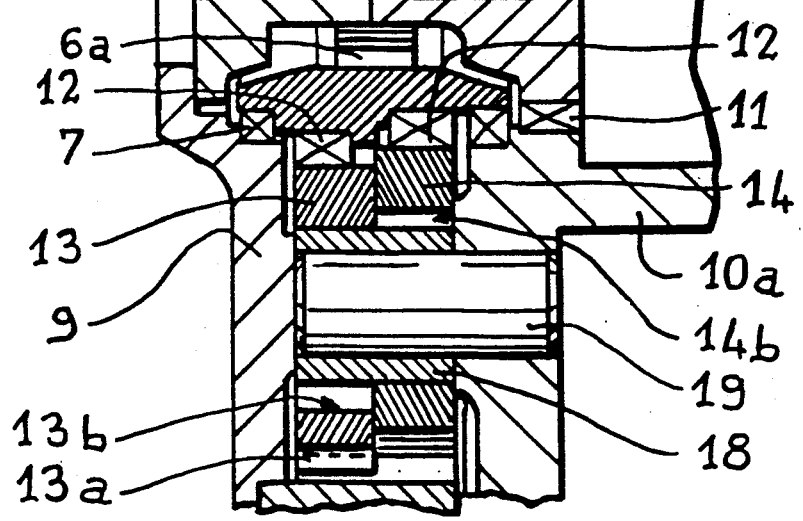

Referring now to the drawings, the fixed frame of the speed reducer shown in FIG. 1 is constituted by the assembly of two parts 1 and 2 of annular profile. This frame 1-2 supports an input shaft 3 which is driven in rotation by a motor shown schematically at 4 and on which is fitted a pinion gear 5. The gear meshes with the inner teeth 6a of a ring 6, disposed coaxially about the frame 1-2 while being supported by two roller bearings 7 and 8 respectively mounted, the first, in a fixed cover 9 secured to the frame 1-2, the second, in a rotary plate 10. This plate 10 is carried by the frame 1-2 with the aid of a roller bearing 11 and it is provided, opposite the fixed plate 9, with an annular flange 10a forming the output shaft for the reducer.

Figure 2:
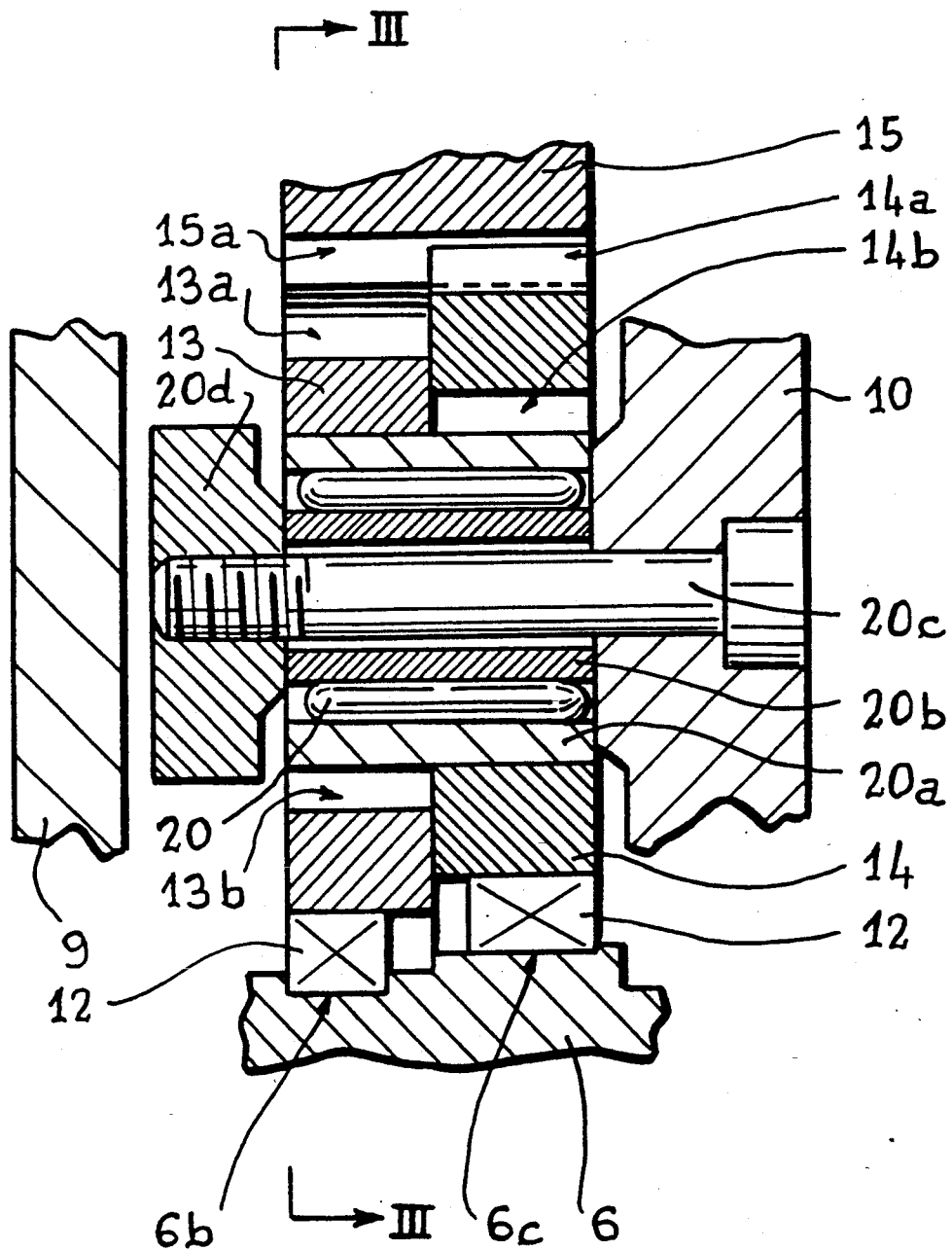
FIG. 2 is a section in detail, on a larger scale, illustrating the original structure according to the invention.
Figure 3:
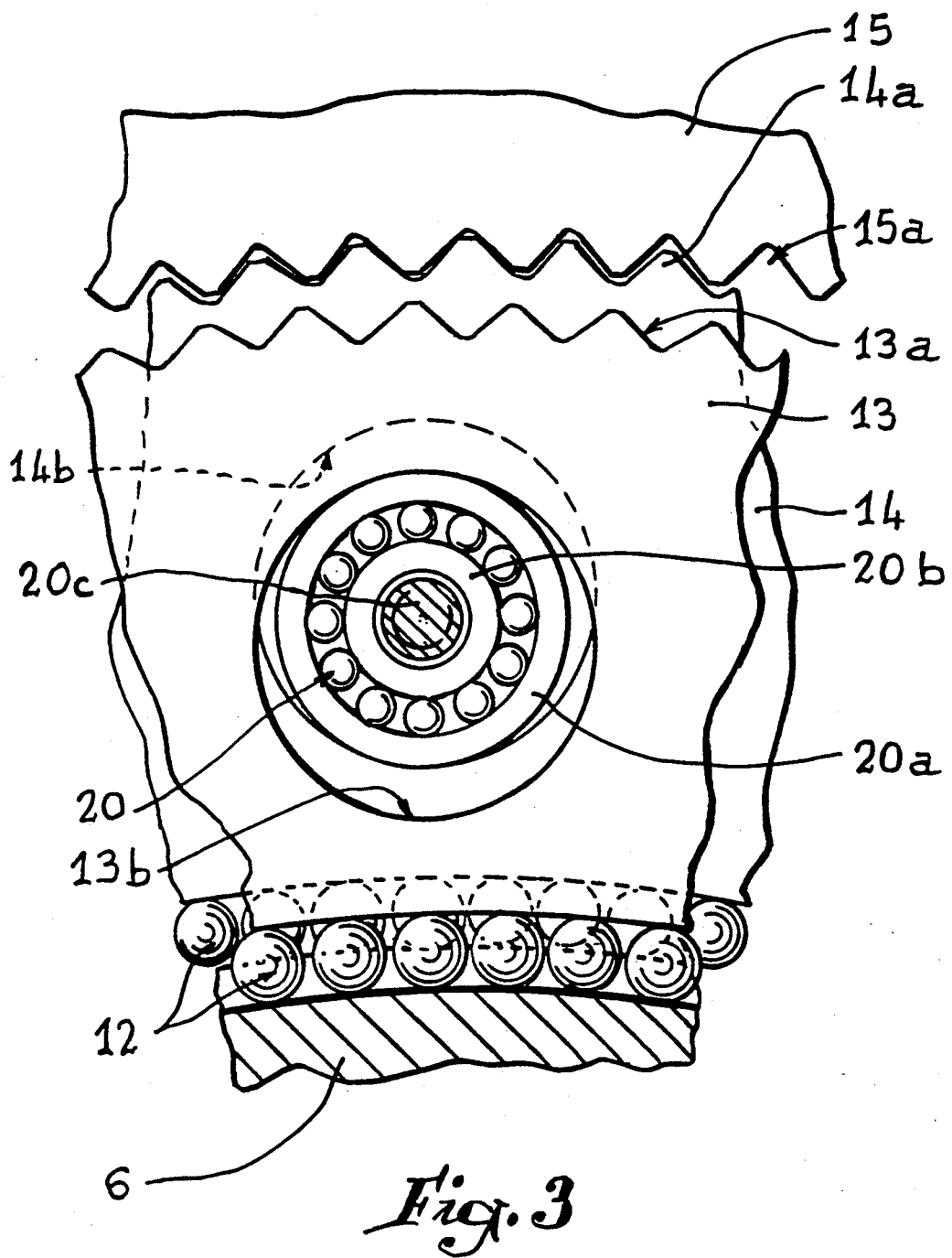
FIG. 3 is a section along the plane indicated at III—III in FIG. 2.

The outer wall of the ring 6 is machined to include two eccentric annular bearing surfaces 6b and 6c, the eccentric surfaces being disposed opposite each other. On each of these bearing surfaces is mounted, with the interposition of a roller bearing 12, a cam 13, 14 respectively, which are made having an annular profile and whose peripheries are toothed so as to cooperate with the inner teeth of the fixed ring gear 15. As shown in FIGS. 2 and 3 in which references 15a, 13a and 14a have been allocated to the respective teeth of the fixed ring gear 15 and of each of the cams 13 and 14, the number of teeth 15a slightly greater (in fact by one or two units) than that of the teeth 13a and 14a of cams 13, 14. The diameter defined by the teeth 13a and 14a is slightly less than the diameter of the inner wall of the ring gear 15.

In order to ensure suitable guiding of the rotary plate 10 on the fixed parts of the assembly, the outer edge of the plate is provided to project with respect to the ring gear 15 secured to the cover 9 and it receives a roller bearing 16 maintained in place with the aid of an annular cover 17.

Each of the toothed cams 13 and 14 is provided with a series of circular openings (referenced 13b, 14b in FIGS. 2 and 3). Once the openings of the two cams have been brought into register with respect to one another, there is introduced into each of the housings thus defined an actuation finger constituted, in the conventional construction illustrated in FIG. 1, by a bushing 18 mounted, with a clearance as reduced as possible, on a cylindrical support or pin 19, which is carried by the plate 10.

As has been indicated hereinabove, correct functioning of such a system involves employing parts which require not only an extremely precise machining but also a very thorough grinding. Furthermore, it is virtually impossible for the torque to be simultaneously transmitted by a plurality of fingers 18-19, which necessitates that the fingers have a large diameter, thus leading to increasing the dimensions of the device.

According to the invention and as illustrated in FIGS. 2 and 3, each actuation finger is constituted by a roller bearing 20 whose rolling members are maintained between an outer ring 20a introduced virtually without clearance in the corresponding openings 13b-14b, and an inner ring 20b which, on the contrary, provides clearance for support pin or screw 20c. The pin is secured with the rotary plate 10 by threading the pin or said screw 20c in a nut 20d.

It will be readily appreciated that the fingers 20 thus made perform a function identical to that of the fingers 18-19 of the conventional construction, namely that of transmitting to the rotating plate 10 which carries them the angular displacement at very reduced speed resulting from the cooperation of the teeth 13a and 14a with the fixed teeth 15a under the effect of the rotation, at relatively rapid speed, of the bearing surfaces or eccentrics 6b and 6c of the rotating ring 6.

Nevertheless, whereas the conventional system according to FIG. 1 behaves rigidly, the structure of the fingers 20 according to the invention enables the fingers to be self-centered in the openings 13b-14b during assembly; this phenomenon of self-centering allows the use of parts having only a moderate machining precision, at the same time as it ensures the simultaneous transmission of the output torque through a plurality of actuation fingers. In this way, a substantial lowering of the manufacturing cost is obtained, as well as a reduction in the dimensions of the device.

It will be understood that the number of the actuation fingers 20, like that of cams 13 and 14, may vary depending on the application.

It must, moreover, be understood that the foregoing description has been given by way of example and that it in no way limits the domain of the invention which would not be exceeded by replacing the details of execution described by any other equivalents.

What is claimed is:

1. In a speed reducer of the cycloidal type for industrial manipulators which reducer includes a frame supporting a fixed ring member having a first plurality of annularly spaced teeth, a rotatable input shaft, means for rotatably engaging the input shaft to at least one eccentric means which surrounds the input shaft, cam means having inner and outer surfaces, the cam means being driven by the eccentric means and having a second plurality of teeth on the outer surface thereof which are engagable with the teeth of the fixed ring member, the first plurality of teeth being greater in number than the second plurality of teeth, a rotatable drive plate including an output means, actuation means carried by the drive plate for drivingly connecting said drive plate to the cam means, and the actuation means being receivable within an opening in the cam means, the improvement comprising, said actuation means including pin means which is mounted with clearance within a cylindrical member, securing means for securing said pin means with respect to said cylindrical member, and said pin means being self-centered relative to said cylindrical member as said pin means is secured by said securing means.

2. The speed reducer of claim 1, wherein said cylindrical member includes an outer ring which is securely seated within the opening of the cam means, an inner sleeve spaced form an outer sleeve by roller bearing means, and said inner sleeve being spaced in surrounding relationship to said pin means.

3. The speed reducer of claim 2, in which said pin means includes a head portion seated within the plate means and a threaded free end portion, a locking means including a nut for threadingly engaging said threaded free end portion of said pin means.

* * * * *